(12) United States Patent
Henttonen et al.

(10) Patent No.: US 6,209,727 B1
(45) Date of Patent: Apr. 3, 2001

(54) SEPARATION DEVICE HAVING ABUTMENT RINGS AS AN OUTER COVER

(75) Inventors: Vesa Henttonen, Turku; Pasi Leimu, Poikko; Mikko Suikki, Raisio; Jaakko Paatero, Turku, all of (FI); Claes Karlsson; Milan Teppler, both of Västerås (SE)

(73) Assignee: Valmet-Raisio Oy, Raisio (FI)

( * ) Notice: Subject to any disclaimer, the term of this patent is extended or adjusted under 35 U.S.C. 154(b) by 0 days.

(21) Appl. No.: 09/125,829

(22) PCT Filed: Feb. 26, 1997

(86) PCT No.: PCT/FI97/00128

§ 371 Date: Dec. 10, 1998

§ 102(e) Date: Dec. 10, 1998

(87) PCT Pub. No.: WO97/32649

PCT Pub. Date: Sep. 12, 1997

(30) Foreign Application Priority Data

Mar. 4, 1996 (FI) .......................................... 960994

(51) Int. Cl.[7] .......................... B01D 33/39; B01D 33/42
(52) U.S. Cl. .............. 210/348; 210/321.63; 210/321.64; 210/321.72; 210/321.8; 210/321.89; 210/346; 210/450
(58) Field of Search .................................... 210/348, 320, 210/319, 334, 336, 357, 305, 314, 298, 345–347, 321.63, 321.64, 450, 321.72, 321.8, 321.89; 277/918, 925, 598

(56) References Cited

U.S. PATENT DOCUMENTS

| | | | |
|---|---|---|---|
| 3,203,549 | * | 8/1965 | Schaedler .............................. 210/136 |
| 4,221,663 | * | 9/1980 | Little .................................... 210/193 |
| 4,650,584 | * | 3/1987 | Macierewicz ..................... 210/512.2 |
| 5,679,249 | * | 10/1997 | Fendya et al. .................. 210/321.63 |

FOREIGN PATENT DOCUMENTS

| | | |
|---|---|---|
| 943014 | 6/1994 | (FI) . |
| WO 93/12859 | 7/1993 | (WO) . |

* cited by examiner

*Primary Examiner*—W. L. Walker
*Assistant Examiner*—Marianne Ocampo
(74) *Attorney, Agent, or Firm*—Burns, Doane, Swecker & Mathis, L.L.P.

(57) ABSTRACT

The invention relates to an improved separation device in which a plate unit containing the filter comprises a separate abutment ring and a cassette which can be easily connected thereto, said cassette comprising at least one filter together with, if required, a frame belonging thereto so as to support the filter. If the filter consists of a flexible membrane, this is fitted into a special frame. However, if the filter is a rigid self-supporting filter of a porous material, for example, a ceramic filter or the like, a separate frame is not needed to support the filter.

16 Claims, 9 Drawing Sheets

SEPARATION DEVICE HAVING ABUTMENT RINGS AS AN OUTER COVER

FIELD OF THE INVENTION

The present invention relates to a device based on cross flow membrane filtration for separation of separable constituents from a liquid medium. Additionally the invention relates to a filter cassette and an abutment ring intended to be used in said separation device.

In a cross flow filter a liquid is supplied to a chamber comprising at least one dynamic membrane. The liquid being supplied is divided into a permeate flow penetrating the dynamic membrane and a reject flow flowing along the filter without penetrating it.

BACKGROUND OF THE INVENTION

Cross flow filtration apparatuses are described in the patent literature, for example, in the Swedish Publication Prints SE 451429, 457607, 459475, 463241 and 465040. Methods based on the use of such apparatuses are successfully applied for separating solid constituents from a liquid phase and for separation of liquid from liquid, for example, for separation of oil from water. The above mentioned Publication Print SE 463241 describes such a fluid/fluid separation method.

SE 459475 describes a separation device comprising several adjacently arranged cells. FIG. 1 shows a section of such a stack. Each unit or cell consists of a plate 10 provided with a central opening through which extends a shaft 11 provided with rotor blades 12. On each side of the plate 10 a filter 15 is fastened by means of clamp rings 13 and 14. The liquid to be treated is supplied through a common channel 16 formed by through-holes in the plates 10. The liquid stream is supplied into the chamber 17, whereby part of it (the permeate) passes through the filter and is gathered via channels 18 in the plate to be finally discharged through a common outlet (not shown). The portion of the liquid flow (the reject) which does not penetrate through the filter, is discharged through holes in the plate. Said holes form a common conduit 19 for the outgoing reject. The liquid is pushed across the filter surface 15 by means of the rotor blades 12.

When the filter is changed in the above mentioned device the plate containing the filter to be changed is taken out. The removing of the plate itself from the stack is carried out relatively easy in a way more closely described in the Publication Print in question. However, the removal of the used filter from the plate and inserting of a new filter is very time consuming and hard because the filter is fastened by means of numerous screws to the clamp rings securing the filter to the plate. This causes for its part long shutdowns in the separation plant.

SUMMARY OF THE INVENTION

According to the present invention a separation device is achieved in which it is possible to change the filters in a very easy and fast way. The invention is based on the idea of instead of fastening the filter directly onto the plate it is fastened on a frame constituting a separate unit or a so called filter cassette. Alternatively, the filter can be a rigid, self-supporting filter of a porous material, for example, a ceramic filter or the like. In this case a separate frame is not required in order to support the filter, instead the filter itself comprises the cassette. The cassette can easily be fitted in an abutment ring intended for the purpose. Thus the abutment ring and the cassette replace the above described plate provided with filters. The filter cassettes can be produced in advance and kept in stock to be at hand when the filter needs to be changed.

An essential advantage of the present invention is that the abutment rings together with the end plates, between which the abutment rings are pressed together, form the outer cover of the apparatus. Said construction is very advantageous with respect to mounting, especially when it comes to high filtration units. If the filtration unit would be positioned inside a separate cover the mounting of the cover would require a free space above the filtration unit corresponding at least to the height of the cover. Alternatively it could be possible to divide the cover vertically in separate portions, but such a solution would not be appropriate in practice. The abutment ring according to the present invention forms a portion of the outer cover of the apparatus corresponding to the thickness of the ring. The fitting and removal of said abutment rings requires minimal working space. Another essential feature of the abutment rings is that they form channels for the liquid streams in the separation device. Adjacent abutment rings form a common channel for the ingoing liquid flow, another common channel for the outgoing reject flow and a third common channel for the outgoing permeate. In addition each separate abutment ring contains channels for distributing incoming liquid over the filter and for gathering the reject flow which has not passed through the filter. Additionally each abutment ring comprises a channel for gathering permeate from the filter. A third essential feature of the abutment rings is that they form the frame for the separate cassettes, whereby the thickness of the abutment rings determines the mutual distance between the separate cassettes.

The invention will be described in greater detail with reference to the enclosed drawings, in which

DETAILED DESCRIPTION OF THE PREFERRED EMBODIMENTS

Figure 1:
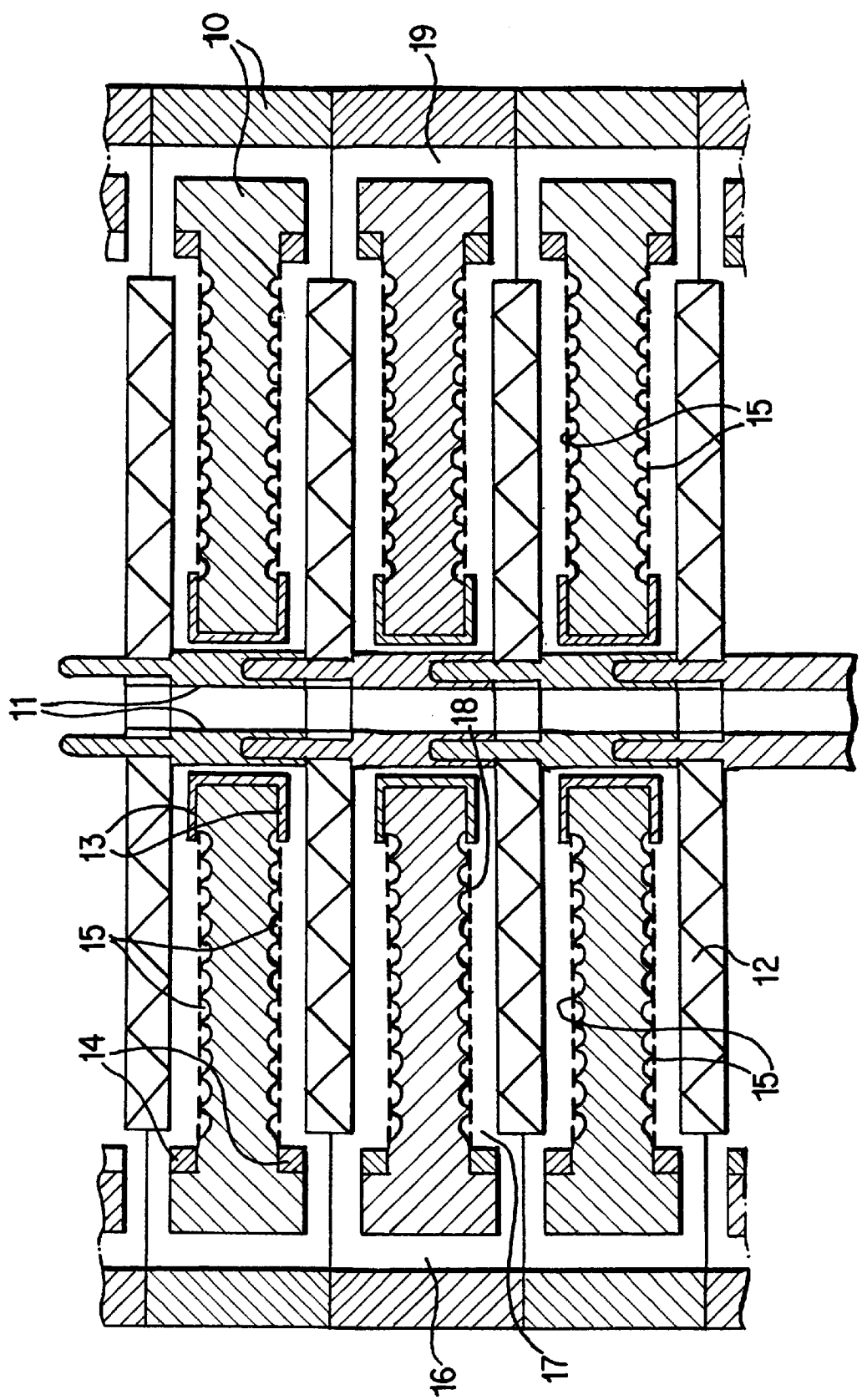
FIG. 1 shows a section of a separation device according to prior art.
Figure 2:
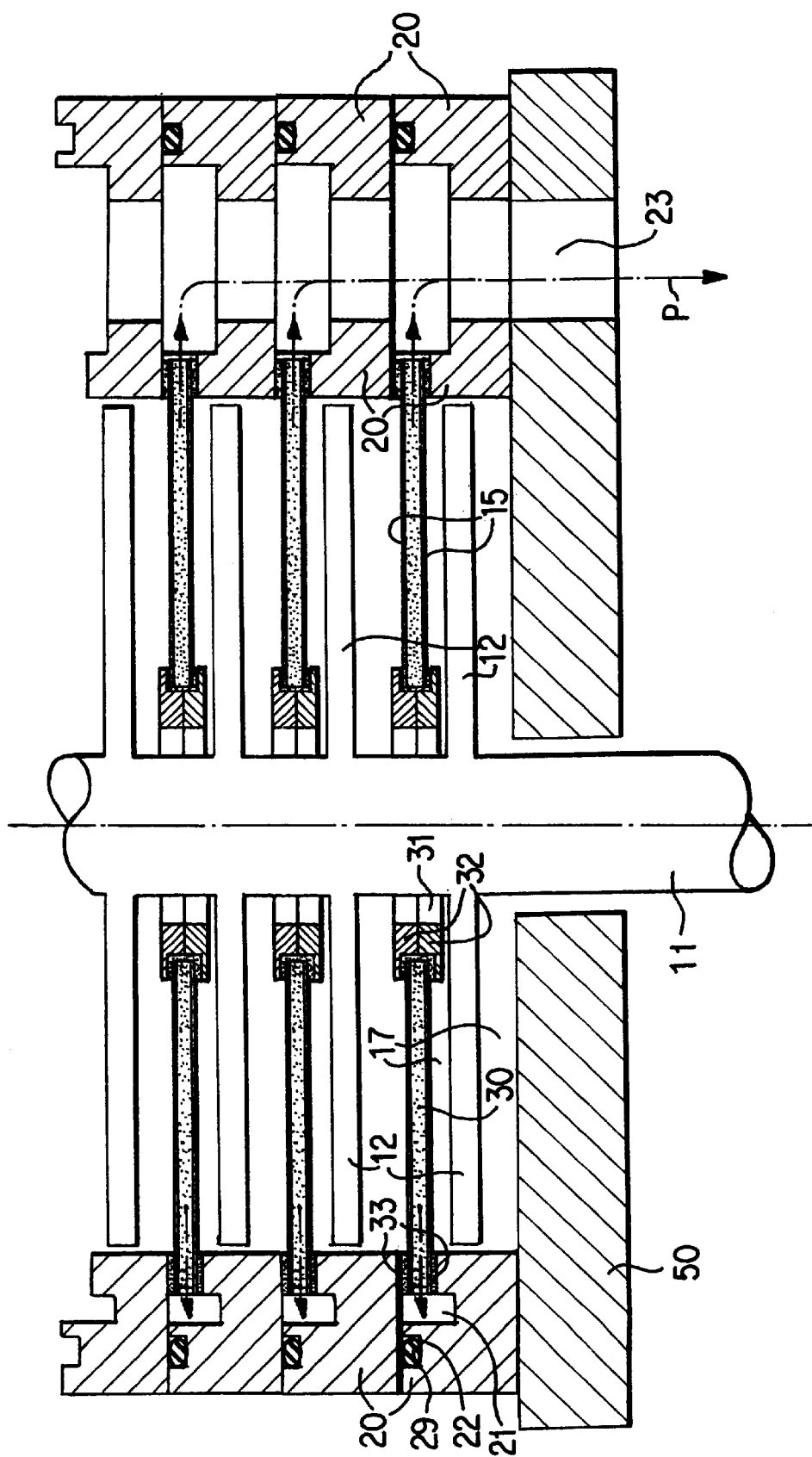
FIG. 2 shows a section of a separation device according to the invention.
Figure 3:
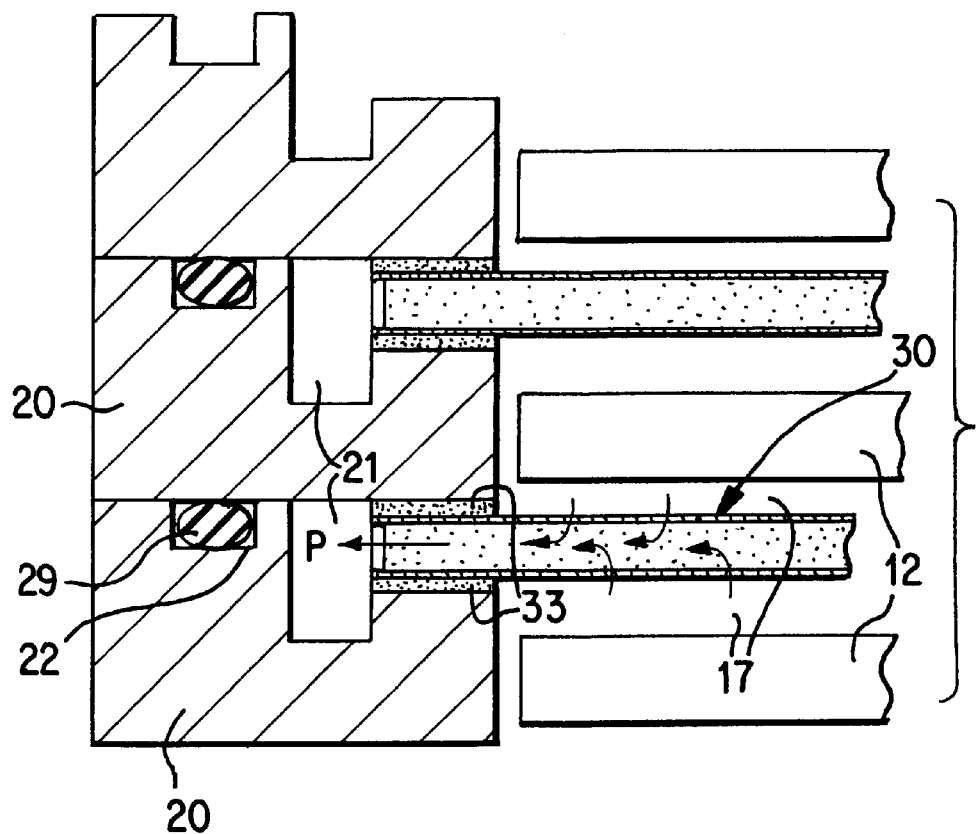
FIG. 3 shows an enlargement of a detail in FIG. 2.
Figure 4:
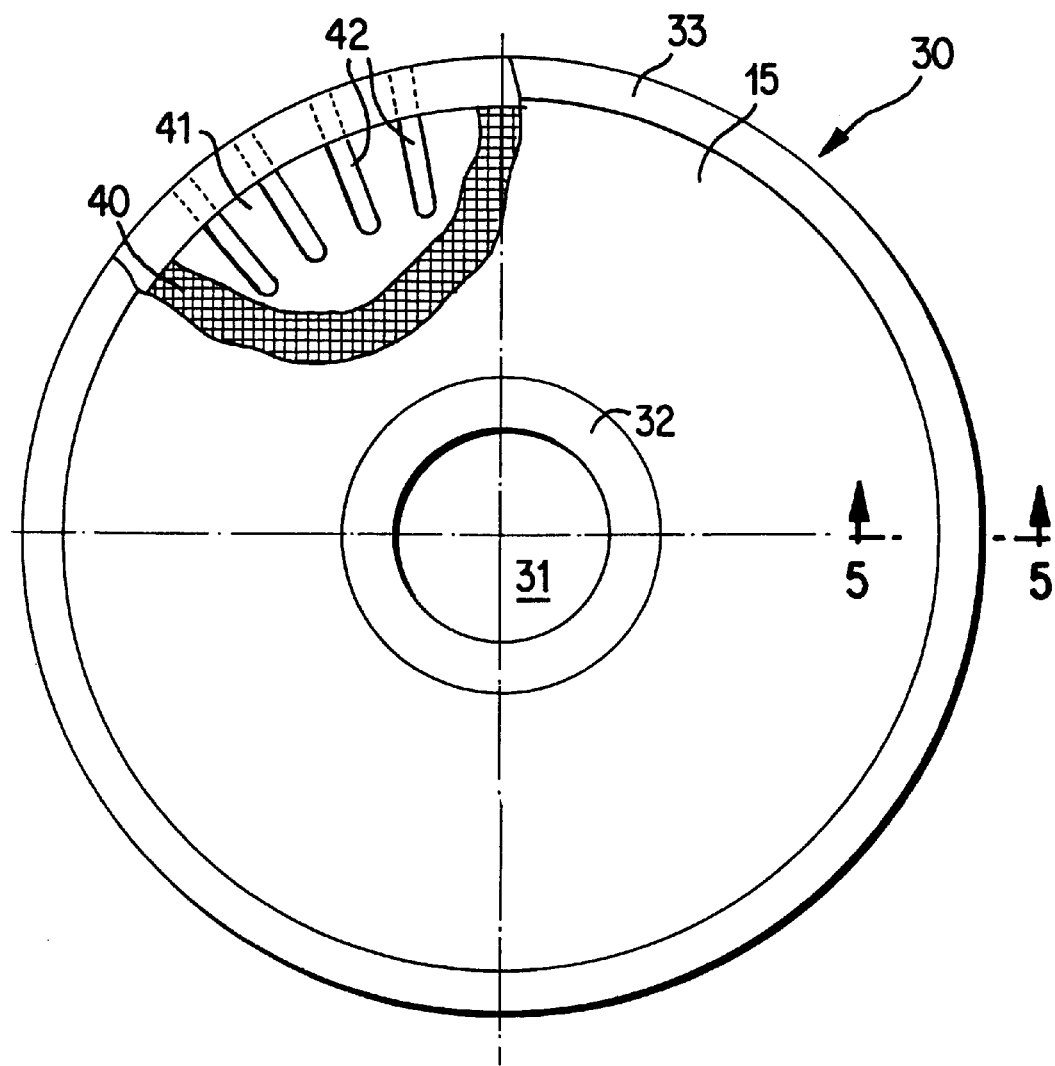
FIG. 4 shows a partial section of a filter cassette.
Figure 5:
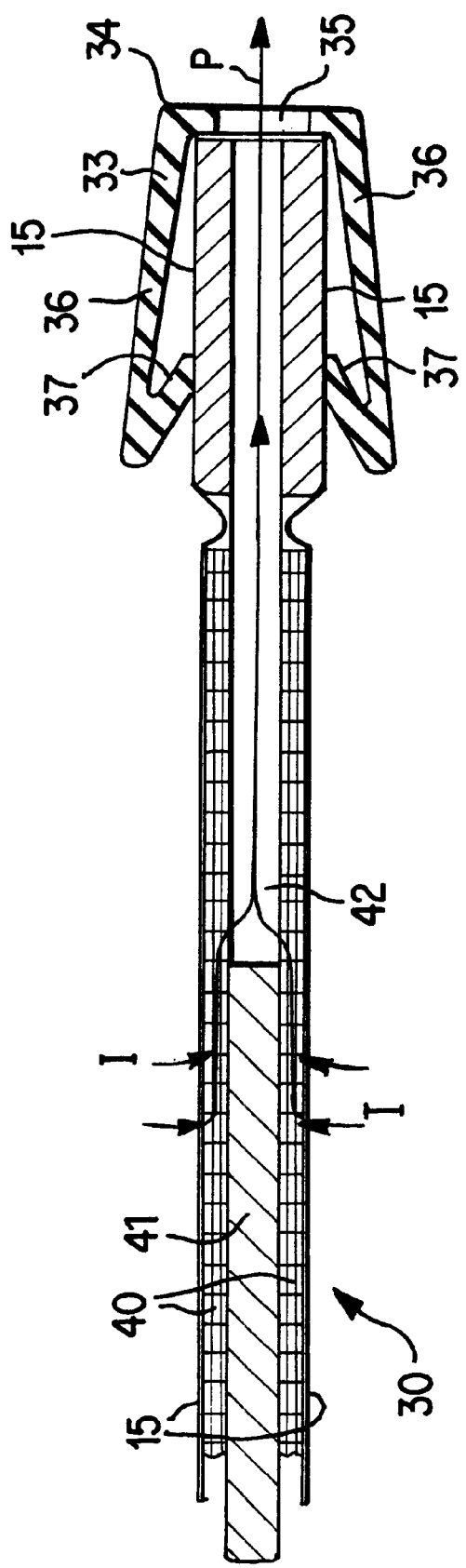
FIG. 5 shows a cross-section of the filter cassette along the line A—A in FIG. 4.

FIG. 2 shows a section of a separation device according to one embodiment of the invention. The separation device consists of a number of adjacently placed cells or units. The stack can comprise horizontal units, as shown in the figure, or vertical units, which is advantageous in liquid/liquid separation. The units comprise an abutment ring 20 to which a filter cassette 30 is connected, whereby the cassette at its periphery is fitted between two adjacent abutment rings. The cassette, which is shown more closely in FIGS. 4–5, is a circular plate with a center opening 31 for the rotor shaft 11 supporting rotor wings 12. Clamp rings 32 extend around the center opening 31 and act as a sealing and keep the cassette together. In the embodiment shown in the figure the cassette contains two filters 15. The liquid to be treated is supplied (not shown in FIG. 2) into the chamber 17, i.e. the area which according to this embodiment is delimited in the direction of the stack by the filter surfaces between the two cassettes. (The chamber is delimited by the filter of the cassette and the end plate at the ends of the stack). The permeate (P) is conveyed out to the periphery of the cassette and flows into the permeate channel 21 of the abutment ring, said channel extending along said abutment ring. The permeate is discharged through a common channel 23 formed by through-holes in the adjacent abutment rings 20. The reject is discharged from the chamber 17 through a common channel which is also formed by through-holes in the adjacent abutment rings (not shown in FIG. 2). The periphery of the cassette is provided with a sealing 33 (see FIG. 3) so that the liquid chamber 17 is separated from the permeate channel 21. A sealing groove 22 with a sealing 29 extends in the abutment ring on the outside of the permeate channel (FIG. 3). The adjacent units are pressed together between the bottom plate 50 and the cover (not shown) in a manner known per se.

FIG. 3 is an enlargement showing more clearly the fitting of the periphery of the cassette between adjacent abutment rings 20.

FIG. 4 shows the filter cassette 30 in a partly sectional view at the periphery. A clamp ring 32 extends around the center opening 31 keeping the inner edge together. Under the filter 15, which in this embodiment is a flexible membrane, for example, a porous textile cloth, paper cloth or a dynamic membrane of the type described in the above mentioned patent publications, is a support net 40 separating the filter 15 from a massive support plate 41 lying under the support net 40. Radially directed grooves 42 extend in the periphery of the support plate discharging the permeate from the cassette. A sealing 33 extending along the periphery of the cassette is to some extent directed inwards along each side of the cassette.

FIG. 5 shows a cross-section of the cassette 30 at the periphery along the section line A—A in FIG. 4. In this embodiment the cassette contains two filters 15 separated by support nets 40, respectively, from the support plate 41 of the cassette. The support net 40 keeps the space between the support plate 41 and the filter 15 stretched so that the permeate can flow towards the periphery where it is gathered in the radial grooves 42 to finally be discharged from the cassette. The end edge 34 of the sealing 33 is provided with radially directed holes 35 for discharging the permeate P from the cassette. The plane sections 36 of the sealing profile are, however, not perforated. The side edges 37 of the sealing profile, which are directed inwards in the direction of the cassette, are curved in against the filter surface in an angle exceeding 90 degrees so that the side edges 37 touch the filter 15 and are obliquely directed outwards towards the periphery of the cassette. By means of this construction the edges 37 will be pressed outwards and obliquely against the filter surface when the sealing profile 33 is pressed together between two adjacent abutment rings. Hereby a tightening of the filter is obtained. In FIG. 5 the liquid flows are indicated with arrows. The incoming liquid flow is designated with I and the outgoing permeate with P.

Figure 6:
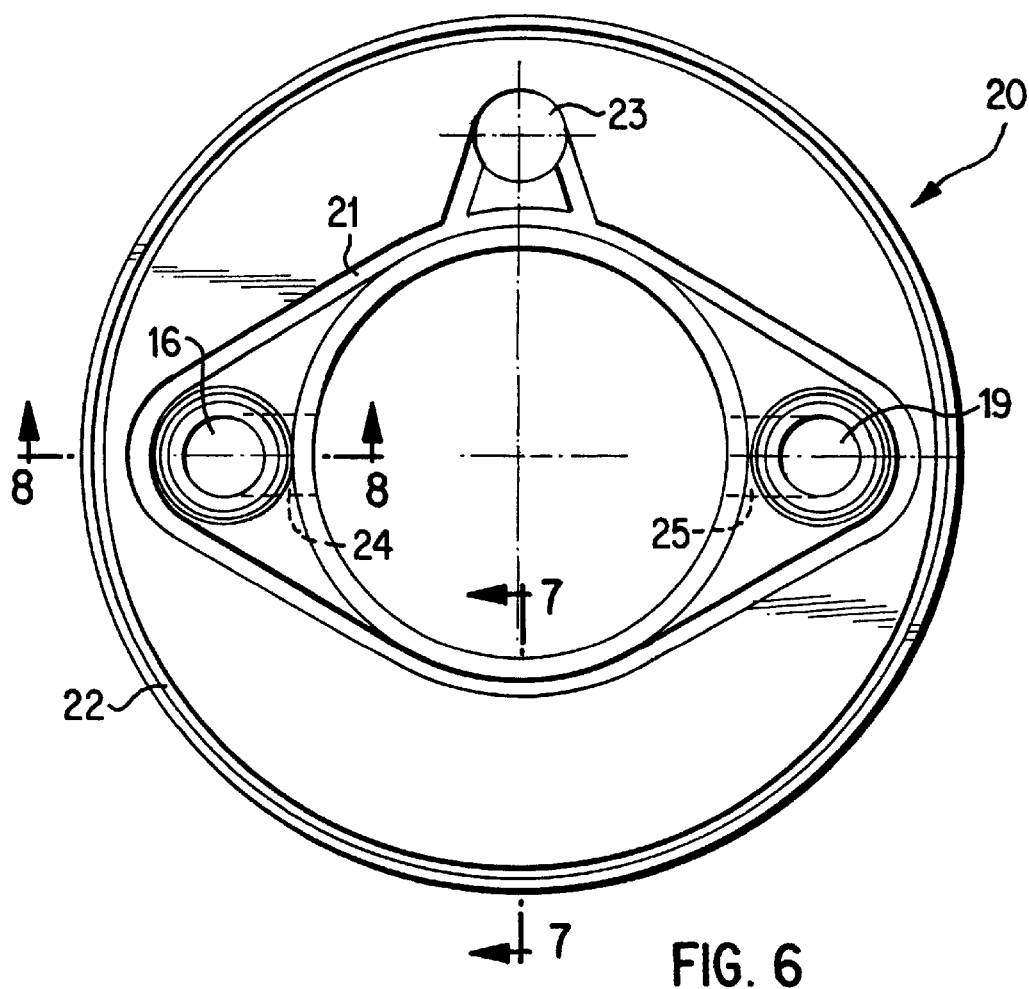
FIG. 6 shows an abutment ring for the filter cassette.
Figure 7:
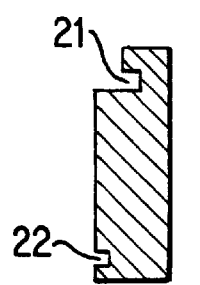
FIG. 7 shows a cross-section along the line B—B in FIG. 6.
Figure 8:
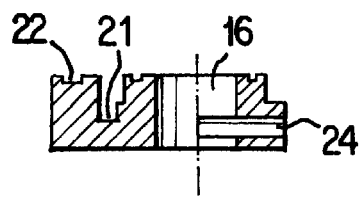
FIG. 8 shows a cross-section of the abutment ring along the line C—C in FIG. 6.

FIG. 6 shows an abutment ring 20 with a through-hole 16 for the incoming liquid flow and another through-hole 19 for the outgoing reject. When several similar abutment rings 20 are placed against each other in a stack, the holes 16 and 19, respectively, will form through-channels. The holes 16 and 19, respectively, communicate with the liquid chamber 17 through channels in the abutment ring (24 and 25, respectively). Additionally, the abutment ring has a through-hole 23, which together with similar holes in adjacent abutment rings forms a common channel for the outgoing permeate. A permeate channel 21 gathering the permeate being discharged from the filter cassette, extends in the same manner as the sealing groove 22 along the whole abutment ring. FIG. 7 shows a section of the abutment ring along the section line B—B in FIG. 6. FIG. 8, which is a section along the line C—C in FIG. 6 shows also the design of the channel 24 viewed from the side.

Figure 9:
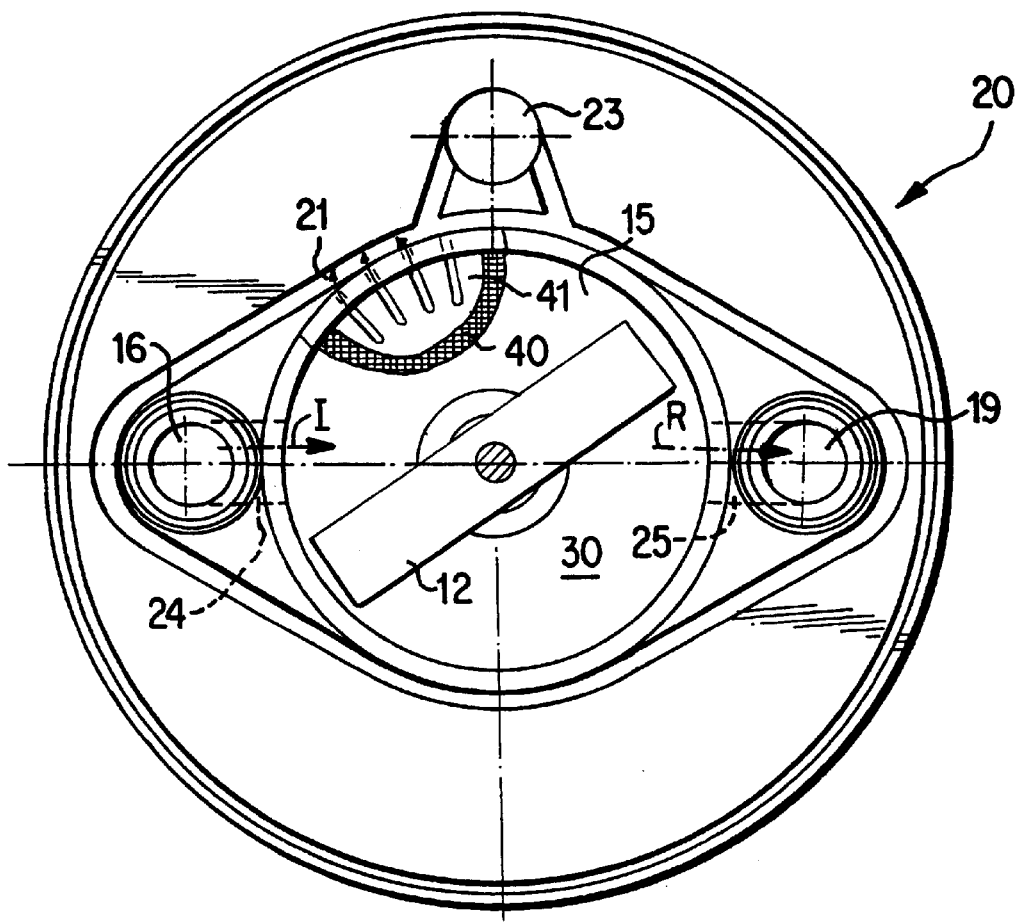
FIG. 9 shows an abutment ring according to FIG. 6 together with a filter cassette according to FIG. 4 fitted into it.

FIG. 9 shows an abutment ring 20 and a filter cassette 30 fitted into it. The permeate P flowing under the filter 15 is gathered by the permeate channel 21 of the abutment ring to finally be discharged through the outlet 23. The liquid flow I supplied through the inlet channel 16 and the channel 24 of the abutment ring is spread across the filter surface 15 by means of the rotor wings 12 or similar means. The reject R is gathered from the filter surface 15 and discharged through the channel 25 extending inside the abutment ring 20 and flows into the common reject outlet 19.

Figure 10:
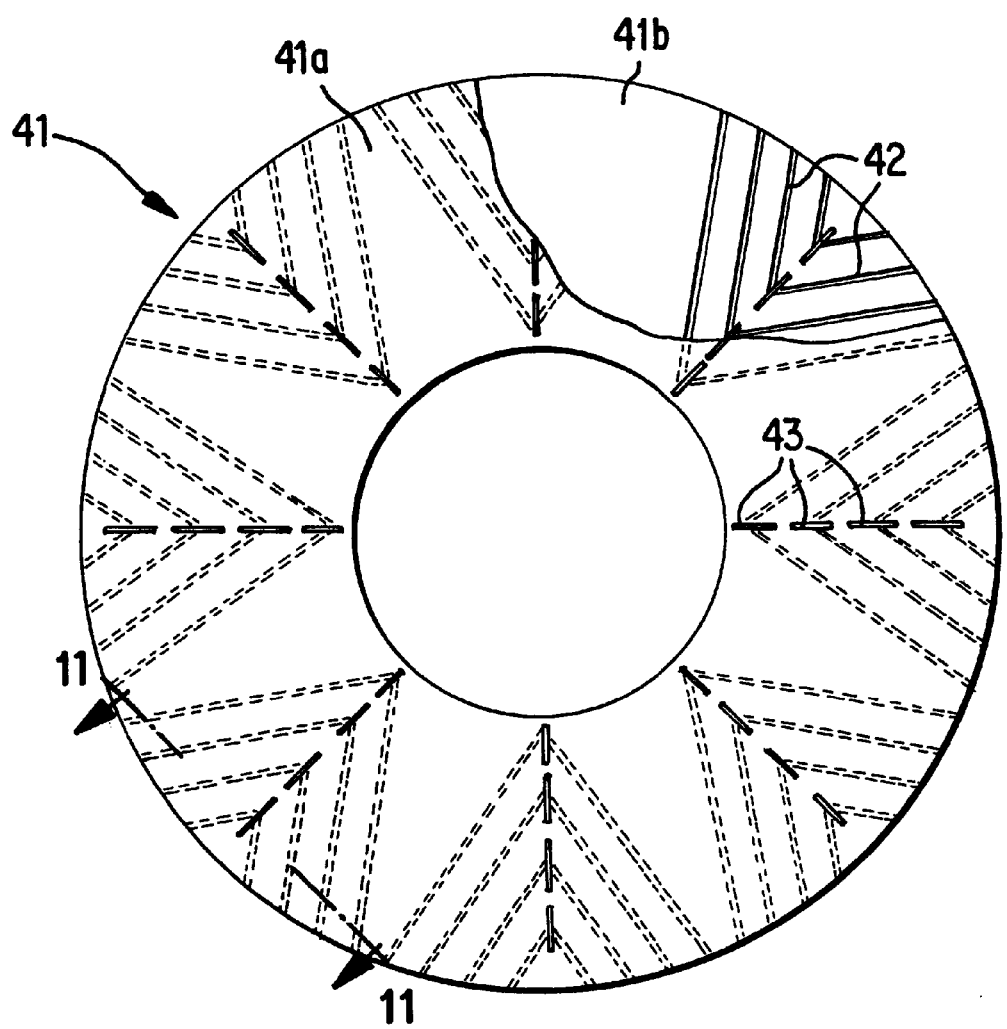
FIG. 10 shows an alternative embodiment of the support plate for the filter cassette.
Figure 11:
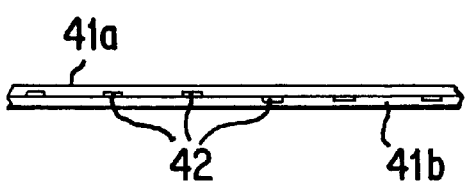
FIG. 11 shows a cross-section of the support plate according to FIG. 10, and FIGS. 12A–12C showing sections of the separation device illustrate alternative ways of arranging the liquid flow in said device.

FIG. 10 shows an alternative embodiment of the support plate 41 in which said plate comprises two thin plates 41a and 41b joined together. The sides of the plates 41a and 41b facing the filter are smooth. The sides of the plates 41a and 41b facing each other are provided with channels with branches which open into the periphery of the support plate 41. The liquid which has passed the filter membrane 15 (not shown in FIG. 10) flows into the channels 42 through slits 43 in the plates, said slits communicating with said channels. According to the arrangement in FIG. 10 the channel system is alternately located in the upper plate 41a and the lower plate 41b. This is best seen in FIG. 11 which shows a cross-section of the support plate according to FIG. 10.

It is evident that the channels 42 in plates 41a and 41b, respectively, can be arranged in alternative ways.

The flow space between the plates 41a and 41b, respectively, can also be achieved in such a way that a net or a porous material is placed between the plates.

Alternatively the compact plates 41a and 41b can be replaced with a porous support plate which in itself allows a filtrated liquid to flow through.

Figure 12A:
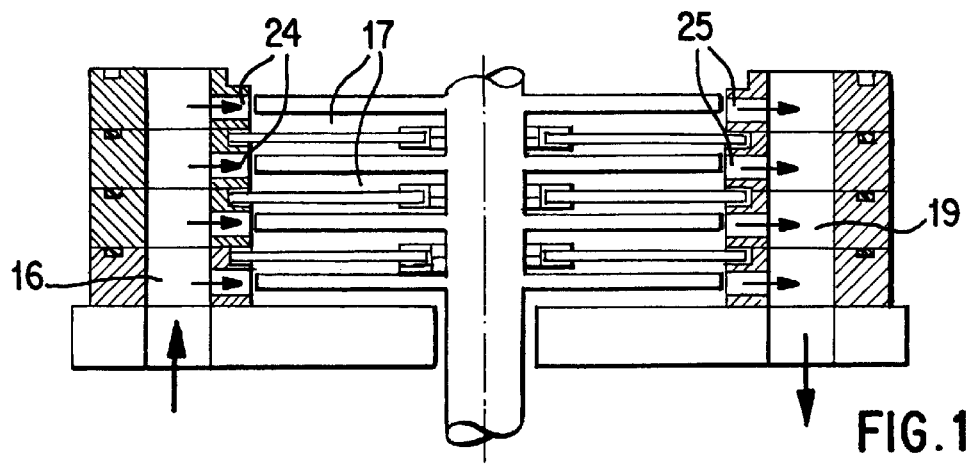
Figure 12B:
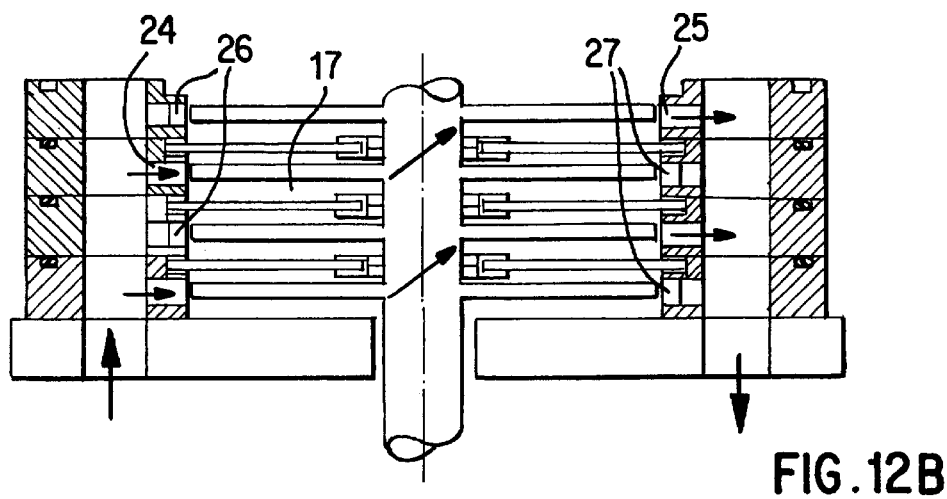
Figure 12C:
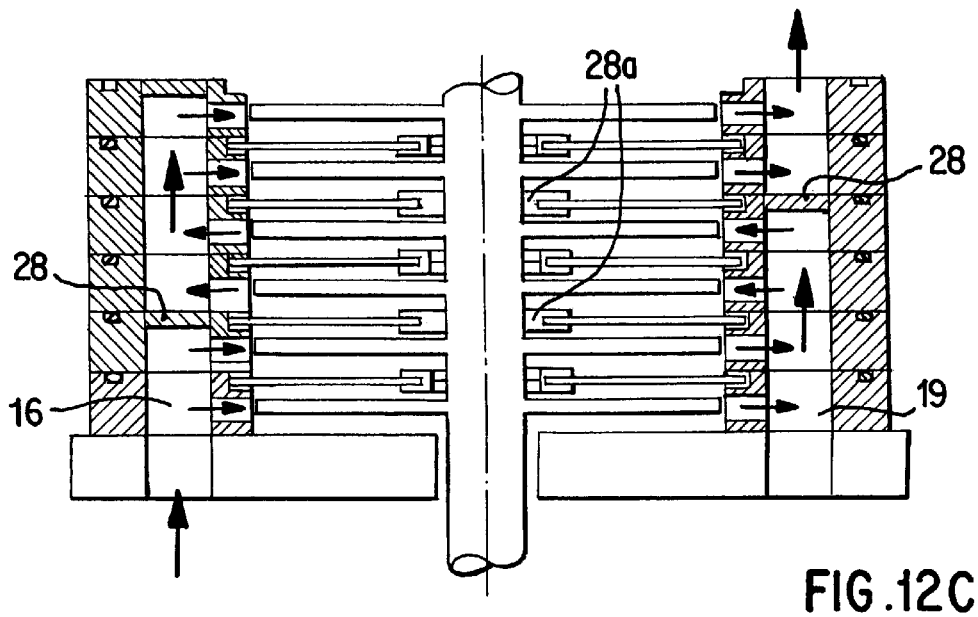

By means of the abutment ring according to the invention it is possible to vary the flow of the liquid to be treated. FIGS. 12A–12C show alternative ways to arrange the liquid flow. FIG. 12A shows parallel driving, where the supplied liquid flows in the common supply channel 16 formed by the abutment rings after which the liquid stream is evenly divided in the channels 24 in the separate abutment rings and flows into the space 17 between the filter cassettes. The reject flow is discharged from the space 17 through channels 25 in the separate abutment rings and flows out in the common outlet channel 19.

A modified version of parallel driving is shown in FIG. 12B where every other inlet channel 24 is blocked with plugs 26 and every other outlet channel 25 is also blocked with plugs 27, but in such a way, however, that it is either the channel 24 or the channel 25 in an abutment ring which is blocked. In this case the liquid flowing into the space 17 through the channel 24 will flow through the center opening of the filter cassette to the opposite side of the cassette to be then discharged through the channel 25 in the next abutment ring. This embodiment increases the turbulence and thereby improves the filtration.

FIG. 12C shows a separation device divided into a number of units connected in series. The division has been achieved by blocking the inlet channel 16 and outlet channel 19, respectively, by means of a plate 28 between two adjacent units. The center opening has also been blocked by means of a ring 28a. As a result of this, the reject from the first unit will be the flow supplied into the following unit. By means of this arrangement a high concentration of solid material is achieved in the reject flow which is finally discharged from the separation device.

It is obvious that the three ways of driving mentioned above can be combined in different ways in one separation device.

The separation device according to the present invention can be used both for separating solid particles, solved high-molecular substances and colloids from liquid and for separating a liquid from another liquid, for example, in the way described in SE 463241.

The filter material is chosen according to the separation process to be carried out. The filter membrane itself can be provided with one or more layers of a porous material when required, for example, of the type described in the above mentioned patent publications.

In the embodiment described above the filter cassette is fitted between two abutment rings. Naturally the filter cassette can also be fitted in only one abutment ring, but the described alternative is to be preferred.

The filter cassette does not necessarily have to have a frame comprising a support plate and a support net in the way described above. The components of the frame are chosen on the basis of the properties of the filter membrane, possible porous covering, etc. The essential purpose of the frame is to give the filter stability, ensure that the filter is kept stretched and to enable fastening of the cassette in the abutment ring. Alternatively the filter can be a rigid, self-supporting filter of a porous material, for example, a ceramic filter or the like. In this case a separate frame is not required in order to give the filter stability because the filter itself forms the cassette.

In the embodiment according to FIG. 2 the separation device is provided with a rotor. This does by no means mean that the invention is restricted to the employment of a rotor. It is obvious that the rotor can be replaced with another device in order to achieve sufficient liquid turbulence and transport. As examples of such equipment transmitters sending sound waves of varying frequences can be mentioned; transmitters of sound waves of varying frequences together with a device for accomplishing electric fields; and a rotor together with a device for accomplishing electric fields. The above embodiments can also be combined.

It is obvious to a person skilled in the art that the various embodiments of the invention may vary within the enclosed claims.

What is claimed is:

1. A device for separation of constituents from a liquid medium containing such constituents, said device including an outer cover and comprising:

a cassette comprising at least one filter and possessing a periphery;

a first abutment ring extending continously around the periphery of the cassette and forming the outer cover of the device, and a second abutment ring in sealing engagement with the first abutment ring, the cassette being held between the first abutment ring and the second abutment ring to provide a liquid-tight chamber within said outer cover;

at least one inlet for supplying the liquid medium into a chamber;

at least one reject outlet for discharging part of the liquid medium as reject, whereby said at least one inlet and said at least one reject outlet are positioned on a first side of the filter;

at least one permeate outlet on a second side of the filter for discharging a liquid medium as permeate which has passed through the at least one filter, and equipment arranged on the first side of the filter for achieving liquid turbulence and transport.

2. The device according to claim 1, wherein the cassette comprises:

a frame for providing the filter with stability; an elastic sealing profile extending at some distance inwards on each side of the periphery of the cassette and which at least partially fastens the at least one filter to the frame.

3. The device according to claim 2, wherein said elastic sealing profile has an end edge which is provided with radially directed holes for discharging the permeate from the cassette.

4. The device according to claim 3, wherein said elastic sealing profile has at least one side edge directed towards the center of the cassette and having a curved profile in an angle >90° so that the at least one side edge of the sealing profile comes into contact with the at least one filter and is directed obliquely outwards towards a periphery of the cassette, whereby the at least one side edge of the sealing profile stretches the filter when the sealing profile is compressed.

5. The device according to claim 1, wherein the cassette comprises a frame having a support plate and fastening elements for fastening a filter on each side of the support plate.

6. The device according to claim 5, wherein the support plate comprises radial grooves formed along a periphery thereof for discharging the permeate from the cassette, and support nets applied to each side of the support plate, whereby each filter is adjacent to a support net.

7. The device according to claim 1, wherein the abutment ring is provided with a channel for receiving the permeate from the cassette and passing said permeate on to the permeate outlet on the second side of the filter.

8. The device according to claim 1, wherein said abutment ring is provided with channels extending in the plane of and inside the abutment ring, whereby one of said channels connects the liquid chamber to the inlet and another of said channels connects the liquid chamber to the reject outlet.

9. The device according to claim 1, wherein the abutment ring is provided with at least:

one channel for receiving the permeate from the cassette and passing the permeate on to the permeate outlet in the abutment ring, and abutment ring channels extending in the plane of the abutment ring and inside the abutment ring, whereby one of said abutment ring channels connects the liquid-tight chamber to the inlet for a supplied liquid flow, and another of said abutment ring channels connects the liquid chamber to the outlet for the reject flow.

10. The device according to claim 1, wherein the at least one inlet, the at least one reject outlet, and the at least one permeate outlet are provided in the first abutment ring, the second abutment ring also including an inlet a reject outlet and a permeate outlet, and wherein the inlets, reject outlets and permeate outlets of the first and second abutment rings, respectively, form uniform channels extending through the device for said liquid medium.

11. A device for separation of constituents from a liquid medium containing such constituents, said device including an outer cover and comprising:
- a cell that includes:
  - a cassette having at least one filter;
  - at least one inlet for supplying he liquid medium into a chamber;
  - at least one reject outlet for discharging part of the liquid medium as reject, whereby said at least one inlet and said at least one reject outlet are positioned on a first side of the filter; and
  - at least one permeate outlet on a second side of the filter for discharging a liquid medium as permeate which has passed through the at least one filter; and
- equipment arranged on the first side of the filter for achieving liquid turbulence and transport; and
- the at least one filter including a flexible membrane fitted to a support plate and a fastening element for fastening the at least one filter to the support plate, the fastening element including an elastic sealing profile extending inwardly on opposite sides of the cassette to at least partially fasten the at least one filter to the support plate and stretching the at least one filter towards the periphery of the support plate, said elastic sealing profile having at least one side edge directed towards a center of the cassette and having a curved profile in an angle >90° so that the at least one side edge of the sealing profile comes into contact with the at least one filter and is directed obliquely outwards towards a periphery of the cassette, whereby the at least one side edge of the sealing profile stretches the filter when the sealing profile is compressed.

12. The device according to claim 11, wherein the support plate is essentially circular and comprises radial grooves which are formed along a periphery thereof for discharging the permeate from the cassette, and each side of the support plate being provided with support nets, each said support net being located adjacent to one of the at least one filter.

13. The device according to claim 11, wherein the support plate includes two adjacent plates between which a flow space is arranged, the flow space opening into a periphery of the support plate and the two adjacent plates being provided with slits communicating with said space.

14. The device according to claim 11, wherein said elastic sealing profile has an end edge provided with radially directed holes for discharging the permeate from the cassette.

15. A device for separation of constituents from a liquid medium containing such constituents, said constituents comprising reject portions and permeate, said device having an outer cover, wherein said device comprises:
- at least one cell, wherein the cell comprises:
  - a cassette comprising at least one filter having a periphery;
  - first and second abutment rings extending continuously around the periphery of the filter and forming the outer cover of the device for separation, and wherein the at least one filter is held between the abutment rings to provide a liquid-tight chamber with said outer cover;
  - at least one inlet for supplying the liquid medium into a chamber;
  - at least one reject outlet for discharging said reject portions, wherein said at least one inlet and said at least one reject outlet are positioned on a first side of said at least one filter; and
  - at least one permeate outlet for discharging said permeate, wherein said at least one permeate outlet is positioned on a second side of said at least one filter.

16. The device according to claim 15, wherein the cassette comprises:
- a frame for providing the filter with stability;
- an elastic sealing profile extending at some distance inwards on each side of the periphery of the cassette and which at least partially fastens the at least one filter to said frame;
- wherein said elastic sealing profile has an end edge and at least one side edge, said end edge being provided with radially directed holes for discharging the permeate from the cassette, said at least one side edge being directed in a direction towards the center of the cassette and having a curved profile in an angle >90° so that the at least one side edge of the sealing profile comes into contact with the at least one filter and is directed obliquely outwards towards a periphery of the cassette, whereby the at least one side edge stretches the filter when the sealing profile is compressed.

* * * * *